No. 641,448. Patented Jan. 16, 1900.
H. H. GORTON.
GATE.
(Application filed July 25, 1899.)
(No Model.) 2 Sheets—Sheet 2.
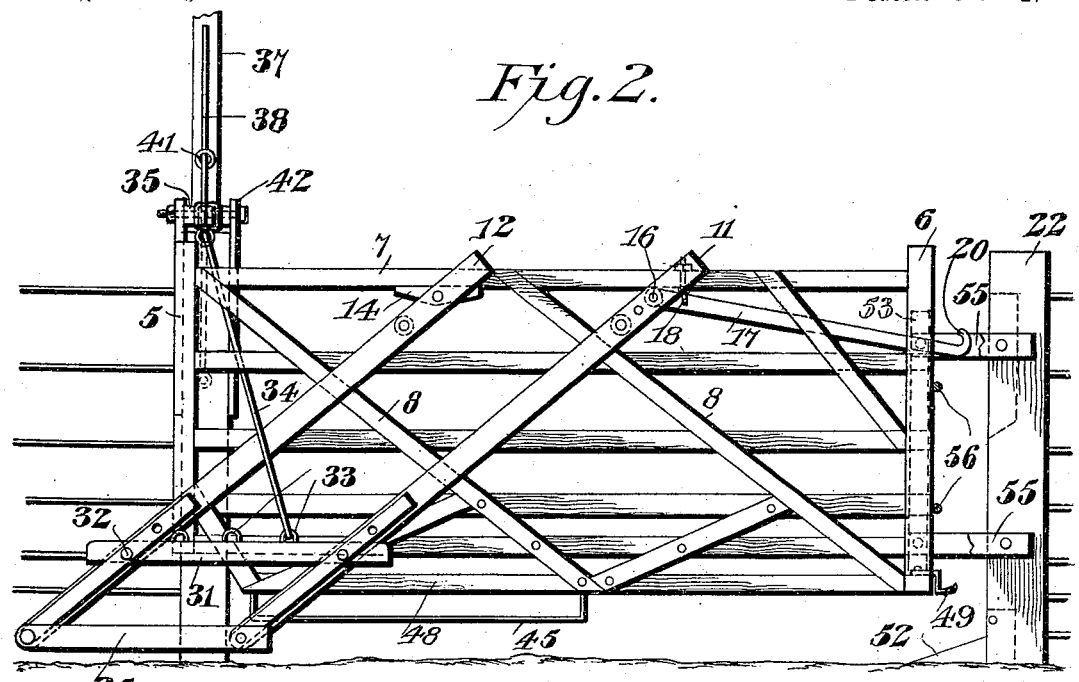
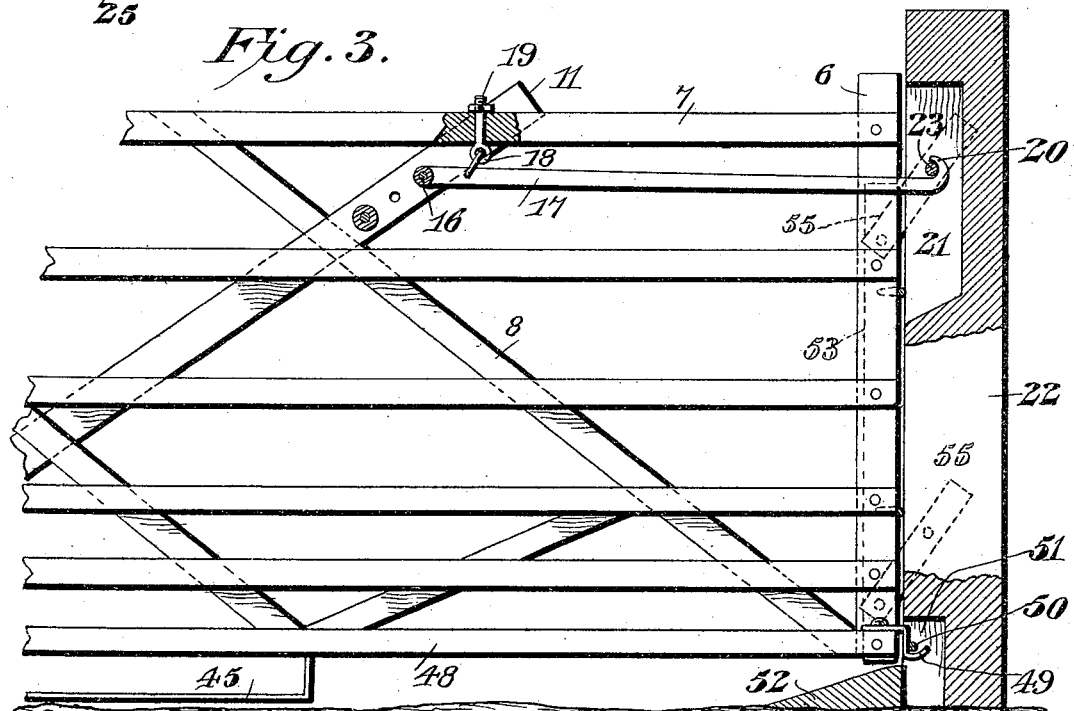
Witnesses H. H. Gorton Inventor

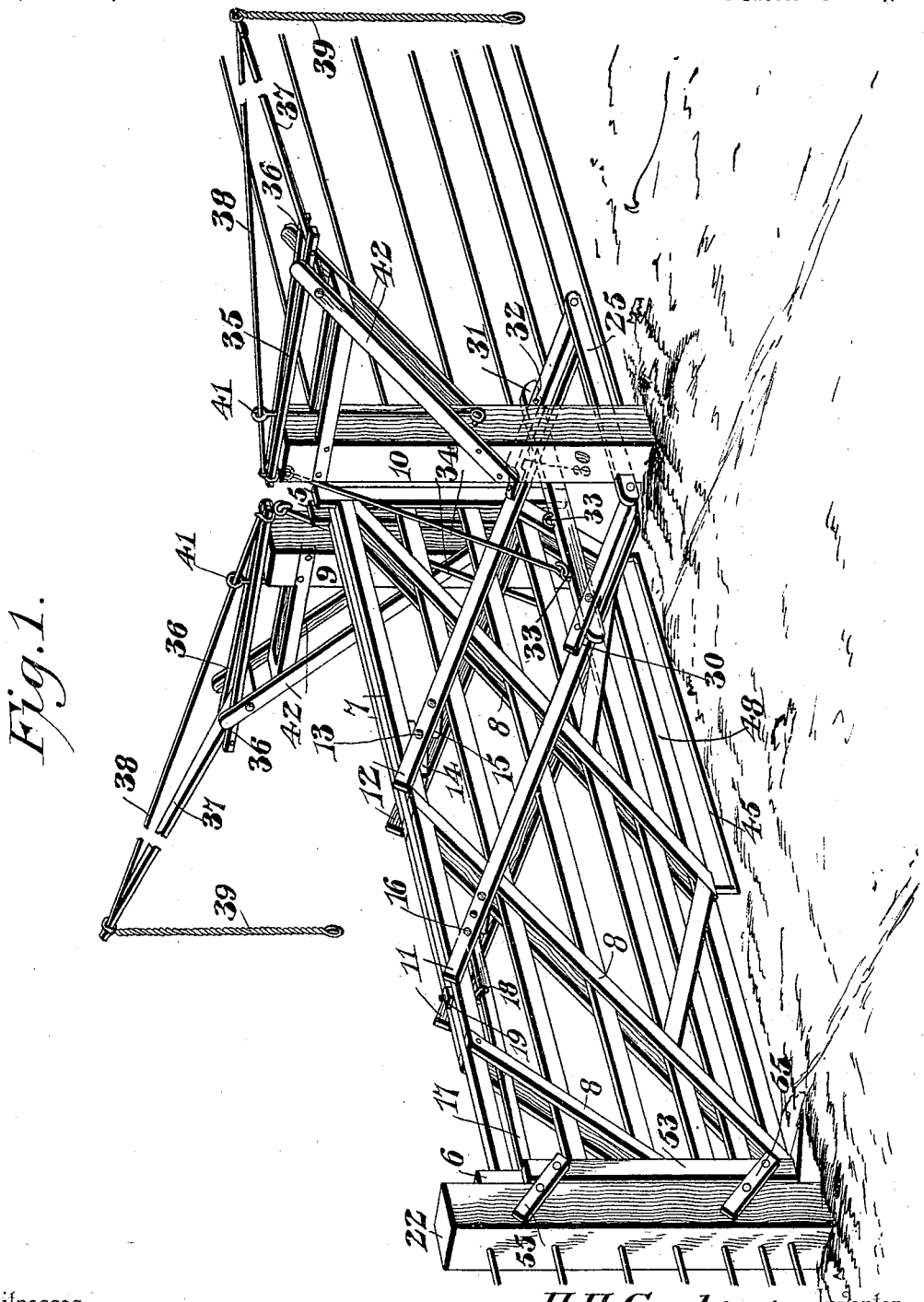

UNITED STATES PATENT OFFICE.

HENRY HALE GORTON, OF WALLACE, MISSOURI.

GATE.

SPECIFICATION forming part of Letters Patent No. 641,448, dated January 16, 1900.

Application filed July 25, 1899. Serial No. 725,046. (No model.)

*To all whom it may concern:*

Be it known that I, HENRY HALE GORTON, a citizen of the United States, residing at Wallace, in the county of Buchanan and State of Missouri, have invented a new and useful Gate, of which the following is a specification.

This invention relates to gates in general, and more particularly to that class which are adapted for reciprocation; and the object of the invention is to provide a gate which may be raised bodily and passed from one side to the other of the centers of gravity of rock-levers connected therewith and also to provide a simple and efficient mechanism for thus moving the gate.

A further object of the invention is to prevent lifting of the gate, due to the rooting of animals beneath it, and also to provide means for supporting the gate at an elevation to permit passing of certain animals beneath it while barring the passage of other animals, and to provide means for latching the gate in its different operative positions.

Further objects and advantages of the construction will be apparent upon reference to the following specification.

In the drawings forming a part of this specification, and in which similar numerals of reference designate corresponding parts in the several views, Figure 1 is a perspective view showing the normally-closed position of the gate. Fig. 2 is a side elevation showing a different closed position of the gate. Fig. 3 is a detail side elevation of the end of the gate carrying the latching mechanism and of the latch-post, said post and gate being partially in section.

Referring now to the drawings, the gate proper consists of end pieces 5 and 6, having parallel cross-pieces 7 and diagonal braces 8 of any desired construction and arrangement. This gate is disposed between parallel uprights 9 and 10, to which it is pivotally connected through the medium of rock-levers 11 and 12. Each of these rock-levers 11 and 12 consists of two elements, which lie on opposite sides of the gate and which elements of each lever are rigidly connected. The pivotal connection of the elements of levers 12 with the gate is secured through the medium of a bolt 13, passed through the elements and through an intermediate ear 14, fixed to the under side of the top bar of the gate. A brace 15 is also preferably located just below the bolt. The pivotal connection of the elements of levers 11 with the gate is secured through the medium of a pivot pin or bolt 16, passed through said elements and through the rear end of a latch-bar 17, which is pivotally connected through the medium of a link 18 with an eyebolt 19, passed through the top bar. The connection of the link 18 with the latch-bar is adjacent to the bolt 16, said latch-bar extending forwardly and between the uprights 6 of the front end of the gate, beyond which uprights is provided an upwardly-directed hook 20, adapted to enter a recess 21 in the adjacent face of the latch-post 22 and to engage a transverse rod 23 in said recess. Thus if the lever 11 be moved to cause its upper end to rise and fall the latch-bar 17 will be given a swinging pivotal movement to cause it to engage and disengage the rod 23.

The lower ends of the elements of levers 11 and 12 are pivotally connected or fulcrumed to the ends of parallel beams 25, let into the inner faces of the uprights 9 and 10 and just above the surface of the ground. Thus if the rock-levers 11 and 12 are rocked to project alternately at opposite sides of the uprights 9 and 10 they will act to raise the gate from its closed position and carry it in an upward arc and deposit it in a position projecting at the opposite side of the uprights. Moreover, the initial movement of the levers 11 will act to move the rear end of the latch-bar upwardly, acting to disengage the opposite end of the latch from the rod 23. The continued movement of the levers will then shift the gate, as above described.

In order to rock the levers 11 and 12, said levers are provided with laterally-extending bases, the upper ends of which lateral portions are provided with longitudinal slots 30, in which are disposed, at opposite sides of the gate, tie-bars 31. The tie-bar at each side of the gate connects the elements of levers 11 and 12 at that side, the connection of the tie-bars being formed by bolts or pins 32, removably inserted in alining transverse perforations in the bars and levers. A number of these perforations are formed in the levers to enable the adjustment of the tie-bar to vary the leverage applied.

Pivotally connected with each tie-bar 31, through the medium of an eye 33 carried thereby, is a pull-rod 34, having an eye engaging the eye 33, said rod extending upwardly and pivotally engaging the adjacent end of a lever 35, projecting inwardly beyond the adjacent upright. Each of these levers consists of converging bars 36, the ends of which, projecting inwardly of the uprights, meet, while the opposite ends are separated and have interposed between them a bar 37, extending rearwardly and upwardly therefrom. The bars 37 are much longer than the bars 35, and each bar 37 is connected with the meeting ends of the corresponding bars 35 through the medium of a stay-rod 38, which forms a truss in connection with the bars 35 and 37, said bar 37 having at its rear end a flexible handle 39, through the medium of which the lever may be drawn downwardly. Thus it will be seen that upon manipulation of the handle 39, which when the gate is in its closed position is at the upper limit of its motion, the rods 34 will act to lift the gate, while the lever 11 will initially disengage the latch, the movement of the gate being continued until it has passed the center of gravity, after which the handle 39 may be released and the weight of the gate will carry it to its adjusted position.

Pivotally connected with the outer face of each upright 9 and 10 is one end of a link, the opposite end of which is provided with an eye 41, through which the flexible rod 38 is passed. Thus as the connection 39 is drawn downwardly to raise the opposite end of the lever this link will hold the rod 38 against upward movement at the point of its engagement by the eye and because of the elasticity of the bars 35 and 37 will bend the latter. This bending of the bars 35 and 37 will permit the rod 38 to sag sufficiently to allow the work end of the lever to rise to an extent to insure the passage of the gate over the center of gravity or to the center of gravity, which is at the limit of its upward movement. The momentum of the gate will insure its passage slightly beyond the center, after which the retractile effect of the link will draw the lever downwardly, and thus continue the movement of the gate. This operating-lever, comprising the rods 35 and 37, is fulcrumed intermediate parallel arms 42, fixed at their lower ends to the adjacent uprights and having connections near their upper ends with said uprights, said arms and upper connections forming, in effect, parallel brackets, as shown.

In order to hold the gate against upward movement, due to rooting beneath the gate adjacent its rear end, a wire or rod 45 of U shape has its upwardly-extending legs connected with the bottom bar 48 of the gate. When the gate is in its normally-closed position, this bar will lie against the surface of the ground and being of small diameter will not attract the attention of an animal, which instead of moving beneath this rod will attempt to root or squeeze beneath the bar 48, when the raising of the gate will be prevented by the engagement of the bar or rod 45 with the head of the animal.

An attempt to raise the forward end of the gate is prevented by means of a forwardly and upwardly projecting hook 49, fixed to the front end of the gate, and which when the gate is raised engages a transverse rod 50 within a recess 51 in the adjacent face of the latch-post and into which the hook 49 enters. An inclined block 52 is arranged to receive the front end of the gate and insures its resting in a position to engage the latch, as also to engage the hook 49 with the bar 50. As the gate is withdrawn from the latch-post the lifting action of the elements of lever 12 is first exerted because of the link connection of the elements of lever 11 with the gate. This causes the front end of the gate to rise last, and as the gate is drawn rearwardly this front end slides down the block 52, and thus draws the hook 49 downwardly and away from the rod 50.

At times it is desirable to hold a gate of this kind at such a height from the ground as to permit of hogs and other small animals passing from one field to another and at the same time to prevent this passing of other animals. For this purpose parallel uprights 53 are pivotally connected with the latch-post through the medium of links 55, and are thus adapted to be removed toward or away from the latch-post, and in their movement from the latch-post they receive between them the front end of the gate before the gate has moved to its lowermost position. Cross-pieces 56, attached to the rear faces of the uprights, prevent the passage of the gate beyond the uprights.

As shown in Figs. 1 and 2 of the drawings, a number of eyes 33 are carried by the tie-bars 31 in order that the pull-rods 34 may be adjusted for different conditions of operation.

It will of course be understood that in practice the gate proper may have any specific construction, and that various modifications of the structure and parts thereof may be made without departing from the spirit of the invention.

Having thus described the invention, what is claimed as new, and desired to be secured by Letters Patent, is—

1. The combination with a gate and an adjacent latch-post, of a latch pivoted to the gate and adapted for engagement with the post, a rock-lever pivoted to the latch and adapted to operate the latch and raise the gate, a second latch adapted to engage the latch-post, an additional rock-lever connected with the gate, a tie-bar adjustably connected with the levers, additional levers, and adjustable connections between the tie-bars and the last-named levers for transmitting motion from one to the other.

2. The combination with a gate, of a rock-lever pivoted thereto and to a support, a latch pivotally connected with the gate, a second rock-lever pivoted upon a suitable support and pivotally connected with the latch, and a second latch upon the gate disengaged from the post by the action of the first-named lever.

3. The combination with a gate and an adjacent latch-post, of a latch having a swinging and pivotal connection with the gate and provided with a hook adapted to engage a keeper upon the post, a rock-lever pivotally connected with the latch, means for operating said lever to move the latch upon its connection, from the keeper and the post and to move the gate, and a second lever pivotally connected with the gate and connected with the operating means of the first lever, the second lever being adapted to exert a raising action upon the gate in advance of the first lever.

4. The combination with a gate and an adjacent latch-post, of a latch pivoted to the gate and adapted for engagement with the post, a rock-lever pivotally connected with the latch and having initially lost motion with respect to the gate, to operate the latch in advance of the gate, and a second rock-lever pivoted to the gate and having means in common with the first-named lever for operating it.

5. The combination with a gate, of a rod fixed thereto and lying therebelow, and at a sufficient distance therefrom to permit rooting of an animal between it and the gate.

6. The combination with a gate and an adjacent post, of uprights pivotally connected with the post to lie at various distances from the points of the post to which they are attached, and adapted to receive between them the adjacent end of the gate.

7. The combination with a gate and an adjacent post, of uprights pivotally connected with the post and adapted to project therefrom at various elevations and to receive between them the adjacent end of the gate, and cross-bars adapted to limit the movement of the gate between the uprights.

8. The combination with a gate and an adjacent post, of uprights adjustably connected therewith and adapted to lie at various distances from the points of the post to which they are attached and to receive between them the adjacent end of the gate.

In testimony that I claim the foregoing as my own I have hereto affixed my signature in the presence of two witnesses.

HENRY HALE GORTON.

Witnesses:
ROBERT H. LUCAS,
JOHN SURFACE.